ELECTRICAL DEVICE AND METHOD OF PREPARATION

Filed May 1, 1952

INVENTOR.
HANS E. HOLLMANN
BY [signature]
ATTORNEYS

Patented May 19, 1953 2,639,380

UNITED STATES PATENT OFFICE 2,639,380

ELECTRICAL DEVICE AND METHOD OF PREPARATION

Hans Erich Hollmann, Oxnard, Calif.

Application May 1, 1952, Serial No. 285,529

18 Claims. (Cl. 250—31)

Figure 1:
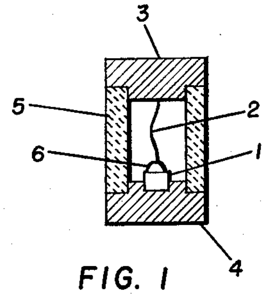

(Granted under Title 35, U. S. Code (1952), sec. 266)

The invention described herein may be manufactured and used by or for the Government of the United States of America for governmental purposes without the payment of any royalties thereon or therefor.

This invention relates to electrical devices and is more particularly concerned with the production of crystal diodes and transistors, and the method of producing them.

Crystal diodes and transistors are well known electrical devices. Such devices generally comprise a semi-conducting crystalline element, e. g. germanium, which element is unidirectional or unipolar with respect to passage of an electric current through it, and one or more electrodes or so-called "whiskers" or "cat whiskers" in point contact with the crystal surface. Devices of this type are disclosed, for example, in U. S. Patents 1,590,224 and 2,504,627. In crystal diodes, a single whisker is in contact with the crystal and in amplifying or mixing transistors, two or more whiskers are placed in proper contact with the crystal.

As noted in U. S. P. 1,590,224, considerable difficulty is ordinarily encountered in locating the most sensitive spot for the whisker on the crystal surface. Often the individual whiskers require painstaking care under a microscope for proper adjustment in this respect. The prior art recognized this difficulty and various means have been proposed as a solution to the problem. For example, in U. S. P. 1,590,224 mechanical means are provided for locating the most sensitive spot of the crystal or detector body and for thereafter maintaining the whisker in a selected position thereon. In U. S. P. 2,475,940 is disclosed a crystal contact device prepared by applying a thin layer of plastic material in a state of fluidity to the surface of a semi-conducting crystal, passing a wire through the material, adjusting the end of the wire in the optimum position on the surface of the crystal to prevent lateral movement of the end of the wire relative to the surface of the crystal and thereafter solidifying or polymerizing the plastic material. In this manner the end of the wire is sealed in the selected position on the surface of the crystal. U. S. P. 2,552,052 discloses a crystal rectifier which includes in its structure a set of composite crystalline layers comprising a base of germanium, silicium or copper, upon which is precipitated a layer of crystalline needles.

It is evident from the above that the prior art crystal contact devices are difficult to make because of the necessity for adjusting the whisker in proper contact with the most sensitive spot on the crystal, and are often unsatisfactory in service because a jarring or movement of the device may easily dislodge the whisker from its selected location on the crystal surface.

Accordingly, one object of the invention is the provision of electrical devices, particularly crystal diodes and transistors. Still another object is to eliminate the whiskers customarily employed in conventional crystal diodes and transistors, and to afford improved, compact, rugged devices of this general type free of the difficulties and disadvantages inherent in presently utilized crystal contact devices, particularly as regards displacement of the whiskers employed therein from their position on the crystal surface. Yet another object of the invention is to afford procedure to facilitate manufacture of the invention devices.

Figure 7:
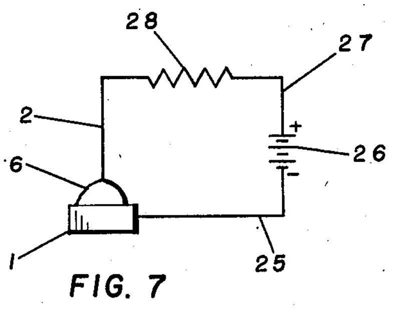
Figure 2:
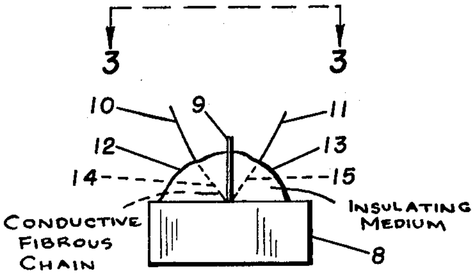
Figure 4:
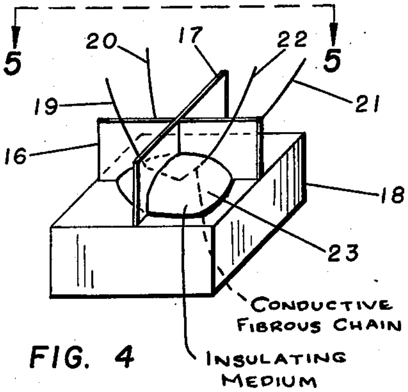
Figure 3:
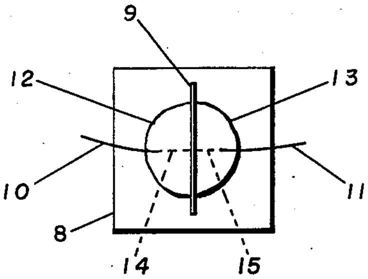
Figure 5:
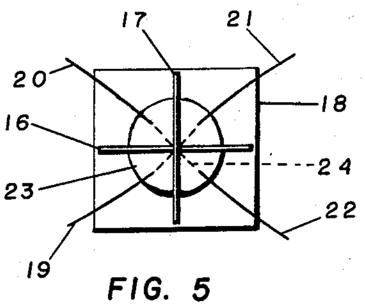
Figure 6:
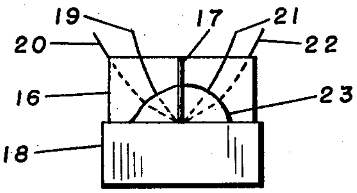

Other objects and many of the attendant advantages of this invention will be readily appreciated as the same becomes better understood by reference to the following detailed description when considered in connection with the accompanying drawings wherein:

Fig. 1 is a cross-section of a crystal diode in accordance with the invention,

Fig. 2 is a schematic representation of a transistor device in accordance with the invention, Fig. 3 is a plan view taken on line 3—3 of Fig. 2, Fig. 4 is a perspective view of another form of the transistor device of the invention, Fig. 5 is a plan view taken on line 5—5 of Fig. 4, Fig. 6 is a schematic front view of the device of Fig. 4, and Fig. 7 is a schematic representation illustrating a step in the preparation of a diode in accordance with the invention.

It has been discovered that when fine conductive particles, e. g. metal particles, are suspended or dispersed in a fluid insulating medium, and the resulting suspension subjected to the action of an electric polarizing field, the metal particles become electrically oriented in the medium in the form of fibrous chains. This fibration is maintained after the originally fluid carrier or insulating medium is caused to solidify, thus in effect "freezing" the conductive particles in their oriented position.

In accordance with this discovery, the invention in one aspect is directed to an electrical device comprising a detector crystal, e. g. germanium, an insulating medium on the surface of said crystal, an electrode in physical contact with said medium and spaced from said crystal, and fine conductive particles suspended in said medium and electrically oriented therein in the form of one or more fibrous chains between the crystal and the electrode. The insulating medium of the invention device is bonded to the surface of the detector crystal, forming one electrode of the device, and the above described fibrous chains bridge the crystal electrode and a second electrode, preferably in the form of a fine wire, which is securely embedded in the plastic medium and spaced from the surface of the crystal. Thus a crystal diode or transistor device may be produced according to the invention principles, where the troublesome whiskers of the conventional devices of this type are replaced by the fibrous chains of the invention, which chains are rigidly fixed in a solid insulating medium in turn securely attached to the crystal, resulting in an efficient, rugged device capable of withstanding relatively severe mechanical shocks and jarring.

The term "fibrous chains" or "fibrous metal chains" as employed herein is intended to denote fibers of a conductive material or metal fibers, and the process of producing such fibers is referred to herein as "fibration."

The crystal diodes or transistors of the invention are prepared, in accordance with another feature of the instant improvements, by a comparatively simple procedure involving applying to the surface of a detector crystal a fluid insulating medium having fine conductive, e. g. metal, particles suspended therein, introducing an electrode into said medium and spacing the end of the electrode from the surface of the crystal, subjecting the suspension to an electric polarizing field to cause the particles to orient themselves in the form of at least one fibrous chain bridging the crystal and the electrode, and solidyfying the insulating medium or the suspension to bond the medium to the crystal and to cause the fibrous chains and the electrode to become securely embedded in the medium.

In carrying out the process, the insulating medium employed may be a plastic material such as wax, paraffin or synthetic resin-forming materials, the latter being preferred. Resin-forming materials suitable for the purposes of the invention include styrene polymers, vinyl polymers, e. g. polyvinyl chloride, acrylic polymers, e. g. n-butyl methacrylate, and the like. Liquid monomers or liquid lower polymers of the foregoing materials, capable of being polymerized to solid form are also representative resin-forming materials suitable as insulating medium, in accordance with the invention. Where the insulating medium employed is not initially in fluid condition, it is first transformed into a fluid state, e. g. by heat, and fine particles of an electrically conductive material, e. g. metals such as copper, silver, gold, platinum, molybdenum, tantalum, tungsten, titanium, chromium, or magnesium, are suspended or dispersed in the fluid mass. Fine particles of semi-conductive materials such as graphite, lampblack, titanium dioxide and magnesium dioxide may also be utilized, although the more highly conductive metallic materials are preferred. The term "conductive material" as employed herein is intended to denote and include semi-conductors as well as conductors.

The resulting plastic-conductive particle suspension or dispersion is then applied to the surface of a semi-conducting crystal such as germanium or silicon, having unidirectional or unipolar electrical properties, and an electrode is introduced below the surface of the insulating medium, the end of the electrode being positioned out of contact with the surface of the crystal. While electrodes of various sizes and shapes may be employed, the use of a fine wire electrode is preferred. Generally, for convenience, the electrode is first located so that its end is in the proper position, usually a short distance from the crystal surface, and the plastic-conductive particle suspension thereafter applied to the surface of the crystal and around the free end of the electrode, immersing the same in the fluid mass. However, if desired, the fluid suspension may be applied to the crystal first and the electrode thereafter immersed in the suspension and positioned therein with the free end spaced from the crystal surface.

An electric polarizing field is then applied to the suspension comprising the insulating medium and the fine conductive particles suspended therein. As long as the suspension is in its original state wherein such particles are under random distribution, an electric current will not flow between the electrodes, e. g. the crystal and a wire electrode in preparation of a diode. However, as soon as a certain voltage is impressed upon both electrodes, the suspension becomes polarized, causing some of the particles therein to arrange themselves in the form of fibers or chains. Means may be provided, in accordance with the invention, for eliminating the polarizing field as soon as the critical voltage is attained, in order to minimize the number of fibrous chains formed and provide an efficient device. The fibrous chains are composed of only a portion of the particles originally suspended in the insulating medium, the remainder of such particles being still randomly distributed throughout the insulating medium.

During or immediately following the fibration operation, where the plastic insulating medium employed is a highly polymeric thermoplastic resin, it is allowed to cool and solidify, and on complete solidification of the medium the conductive, e. g. metal, particles become locked therein in the above noted chain-like or fibrous manner and the metal electrode becomes securely embedded in the medium or carrier. Where the plastic medium is a polymerizable liquid material, e. g. a monomeric or lower polymeric acrylic compound, solidification or hardening thereof may be accomplished by heating the plastic-electrically oriented conductive particle suspension for a time sufficient to cause polymerization of the fluid medium. Alternatively, hardeners or cold-setting promoters may be incorporated in such medium to bring about polymerization thereof with or without the aid of heat. These hardeners or promoters are employed in such an amount that the liquid carrier polymerizes after a predetermined lapse of time sufficient to perform the fibration.

Following fibration and solidification of the plastic-conductive particle suspension, the latter is firmly bonded to the crystal on one hand and to the electrode on the other and exhibits a very low resistance to the passage of an electric current across such crystal and electrode, since the conductive, e. g. metal, fibers or chains have been electrically oriented so as to bridge them. Instead of using only one wire electrode to form a diode, several wires may be introduced into the plastic-conductive particle suspension applied to the surface of the semi-conducting crystal, in such case separating the individual portions of the plastic mass containing each of the wire electrodes by insulating members or partitions, each of which has one edge in contact with the crystal surface, to thus form mixing or amplifying transistors as illustrated hereinafter. In this case, on application of the electric polarizing field, a plurality of fibrous chains are produced bridging each of the wire electrodes and the crystal. These fibrous chains converge at their nodal points which are in contact with the crystal surface and which are separated by the insulating members.

The following are examples of preparation of a diode according to the invention principles:

*Example 1*

Referring to Fig. 1 of the drawing, a device is shown comprising a germanium crystal electrode 1 and a wire electrode 2 both supported by two metal closures 3 and 4 in an insulating cartridge 5. The surface of the germanium is covered with a drop 6 of hot liquid paraffin having fine silver particles suspended therein, in which suspension the free end of wire electrode 2 is immersed. An electric polarizing field is then applied between the germanium and the wire electrode, and under the influence of this field a portion of the fine silver particles orient themselves in the fluid medium in the form of chains or fibers electrically linking the crystal with the wire electrode and completing the diode. In Fig. 7, a convenient means is shown for setting up an electrical polarizing field and removing it a very short time after the first fibrous chain or chains are formed. The crystal electrode 1 is connected via lead 25 to one pole of a battery 26, and the other pole of the battery is connected via lead 27 to a high-ohmic resistor 28 in turn attached to wire electrode 2. When this circuit is placed in operation, as soon as the proper voltage has been applied and the first complete fibrous chain or chains have been formed in the suspension, thus bridging the crystal and the wire electrode 2, the voltage across these electrodes immediately drops and further fibration ceases. In this manner an efficient diode containing substantially only a single contact is produced.

Shortly after fibration the paraffin carrier is solidified by cooling. During this period the carrier becomes integrally bonded to the germanium crystal surface and a crystal diode is produced wherein the conductive fibers are locked in the solid carrier and are well protected against destruction, for example from shock or vibration.

*Example 2*

A crystal diode may be prepared in the same manner as in Example 1 employing fine particles of graphite instead of silver.

The following are examples illustrative of the preparation of transistors according to the invention.

*Example 3*

With reference to Figs. 2 and 3 of the drawing, transistors may be produced according to the invention by dividing the space above a germanium crystal 8 into two sections by means of a very thin mica sheet 9, of for instance about $\frac{1}{100}$ mm. thick, one edge of which is in contact with the crystal surface. Two wire electrodes 10 and 11 are positioned so that their ends are each about 1 mm. above the surface of the germanium crystal. The resulting gaps between the wires and the surface of the germanium are filled with plastic-metal suspensions 12 and 13 consisting of fine gold particles suspended in a fluid acrylic resin-forming medium. In order to cause the metal fibers or chains 14 and 15 formed in each of suspensions 12 and 13 to approach the surface of the germanium at points as close together as possible, the polarizing voltage is impressed upon both wire electrodes 10 and 11 while the germanium remains electrically neutral. The result is that the metal chains 14 and 15 converge with their nodal points, which are in contact with the germanium crystal, located at points closely adjacent both sides of the mica sheet 9, so that only a very small space about the thickness of the mica sheet exists between the nodal points of each of the fibrous contacts or chains 14 and 15, which chains bridge the crystal and each of electrodes 10 and 11. Following fibration the originally fluid or liquid medium suspension is hardened and solidified by application of heat to produce an efficient transistor.

*Example 4*

In accordance with Figs. 4, 5 and 6 of the drawing, a multiple electrode transistor is produced in a manner similar to that of Example 3 except that the single mica sheet 9 is replaced by two mica sheets 16 and 17, each having one edge in contact with the germanium crystal 18, thus dividing the space above the crystal into four zones. Four wire electrodes 19, 20, 21 and 22 are located above the surface of the germanium crystal so that the free end of each of the electrodes is located in a separate zone, and the gaps between the crystal and these electrodes are filled with a fluid plastic-metal suspension 23 as described in Example 3. An electric polarizing voltage is applied to the wires to produce fibration and the fluid insulating medium or suspension is solidified substantially as set forth in Example 3, to form a four electrode transistor in accordance with the invention. As is apparent chiefly from Figs. 5 and 6, the fibrous metal chains 24 formed in each of the four sections bridge crystal 18 and each of the four wire electrodes, and such chains approach each other at the crystal surface at points closely adjacent the intersections of mica sheets 16 and 17.

It is evident from Examples 3 and 4 above that by practice of the invention principles for producing multiple electrode transistors, the fiber or metal chain contacts thereof can be brought into very close proximity on the crystal surface in an electrically controllable manner and in a very much simpler way than in the case of transistors employing conventional whiskers and involving the laborious individual adjustment thereof under the microscope.

From all of the foregoing, it is apparent that the invention enables production of a simple, rugged crystal diode or transistor requiring no adjustment or constant manipulation of conventional whiskers to maintain the device in proper working condition, by a fabrication procedure which assures that the fibrous chain contacts of the invention device are rigidly connected to the crystal, since the supporting carrier material and the crystal are integrally bonded together. Moreover, while the whiskers of conventional diodes and transistors are required to be constructed of only certain scarce metals, usually gold or silver, a wide variety of materials may be utilized to form the fibrous chains of the devices of the invention.

Obviously many modifications and variations of the present invention are possible in the light of the above teachings. It is therefore to be understood that within the scope of the appended claims the invention may be practiced otherwise than as specifically described.

I claim:

1. An electrical device comprising a detector crystal, an insulating medium on the surface of said crystal, an electrode in physical contact with said medium and spaced from said crystal, and fine conductive particles suspended in said medium and electrically oriented therein in the form of at least one fibrous chain between said crystal and said electrode.

2. An electrical device comprising a semi-conducting crystal forming one electrode, a suspension of fine conductive particles in an insulating medium, said medium being bonded to the surface of said crystal, and a second electrode in physical contact with said medium and spaced from said crystal, said conductive particles being electrically oriented in said medium in the form of at least one fibrous chain bridging said electrodes.

3. An electrical device as defined in claim 2, wherein said crystal is germanium.

4. An electrical device as defined in claim 2, wherein said crystal is silicon.

5. An electrical device as defined in claim 2, wherein said insulating medium is of the group consisting of wax, paraffin and synthetic resin-forming materials.

6. An electrical device as defined in claim 2, wherein said particles are metal particles.

7. An electrical device as defined in claim 2, wherein said particles are semi-conductive particles.

8. An electrical device comprising a germanium crystal, a suspension of fine metal particles in a solid insulating medium of the group consisting of wax, paraffin and synthetic resin-forming materials, said medium being bonded to the surface of said crystal, and at least one wire electrode embedded in said medium, the end of said electrode being spaced from said crystal, a portion of said particles being electrically oriented in said medium in the form of at least one fibrous chain bridging said crystal and said wire electrode.

9. A crystal diode as defined in claim 8, wherein one wire electrode is embedded in said medium, said crystal constituting the other electrode of the device.

10. A transistor as defined in claim 8, wherein a plurality of wire electrodes are embedded in said medium, said medium being separated into a plurality of zones each of which contains one of said wire electrodes, and wherein said portion of said particles are electrically oriented in the form of fibrous metal chains bridging said crystal and each of said wire electrodes.

11. A transistor as defined in claim 8, wherein a plurality of wire electrodes are embedded in said medium, at least one insulating member separating said medium into a plurality of zones each of which contains one of said electrodes, said insulating members having an edge in contact with the surface of said crystal, and wherein said particles are oriented in the form of fibrous chains bridging each of said wire electrodes and said crystal and converging with the nodal points of said chains in contact with said crystal, said nodal points being separated by said insulating members.

12. The process for preparing an electrical device which comprises applying to the surface of a detector crystal a fluid insulating medium having fine conductive particles suspended therein, introducing an electrode into said medium and spacing the end of said electrode from the surface of said crystal, subjecting said suspension to an electric polarizing field to cause at least a portion of said particles to orient themselves in the form of at least one fibrous chain bridging said crystal and said electrode, and solidifying said insulating medium to bond said medium to said crystal and to cause said chains and said electrode to become securely embedded in said medium.

13. The process as defined in claim 12 wherein said crystal is a semi-conducting crystal.

14. The process as defined in claim 12 wherein said insulating medium is of the group consisting of wax, paraffin and synthetic resin-forming materials.

15. The process as defined in claim 12 wherein said conductive particles are metal particles and said electrode is a wire electrode.

16. The process for preparing a crystal diode which comprises applying to the surface of a germanium crystal as one electrode a suspension of fine metal particles in a fluid insulating medium of the group consisting of wax, paraffin and synthetic resin-forming materials, immersing a wire electrode into said medium, the end of said electrode being out of contact with said crystal, impressing a polarizing voltage across said electrodes to cause a portion of said particles to orient themselves in the form of fibrous metal chains bridging said electrodes, and solidifying said suspension to bond said medium to the surface of said crystal and to cause said wire electrode and said chains to become securely embedded in said medium.

17. The process for preparing an electrical device which comprises positioning the free end of a wire electrode a short distance from the surface of a germanium crystal, applying to the surface of said crystal and around the end of said electrode a suspension of fine conductive particles in a fluid insulating medium of the group consisting of wax, paraffin and synthetic resin-forming materials, subjecting said suspension to an electric polarizing field to cause a portion of said particles to orient themselves in the form of fibrous chains bridging said crystal and said electrode, and solidifying said insulating medium to bond said medium to the surface of said crystal and to cause said electrode and said chains to become securely embedded in said medium.

18. The process for preparing a transistor which comprises positioning the ends of a plurality of wire electrodes a short distance above the surface of a germanium crystal, dividing the space above the surface of said crystal into a plurality of zones by means of at least one insulating member so that the free end of each of said electrodes is located in one of said zones, applying to the entire surface of said crystal and around the free ends of said electrodes a suspension of fine metal particles in a fluid insulating medium of the group consisting of wax, paraffin and synthetic resin-forming materials, impressing a polarizing voltage across said electrodes to cause a portion of the metal particles in said insulating medium in each of said zones to orient themselves in the form of fibrous metal chains bridging said crystal and each of said electrodes, said chains approaching each other at the surface of the germanium crystal and at points closely adjacent said insulating members, and solidifying said suspension in each of said zones to bond said medium to said crystal and to cause said wire electrodes and said chains to become securely embedded in said medium.

HANS ERICH HOLLMANN.

References Cited in the file of this patent

UNITED STATES PATENTS

| Number | Name | Date |
|---|---|---|
| 1,551,845 | Popper | Sept. 1, 1925 |
| 2,475,940 | Brittain | July 12, 1949 |